(12) United States Patent
Jimenez

(10) Patent No.: US 8,887,357 B2
(45) Date of Patent: Nov. 18, 2014

(54) REMOVABLE SAFETY HANDLE FOR MOTORCYCLE PASSENGERS

(76) Inventor: Juan Jimenez, Bronx, NY (US)

( * ) Notice: Subject to any disclaimer, the term of this patent is extended or adjusted under 35 U.S.C. 154(b) by 445 days.

(21) Appl. No.: 12/773,378

(22) Filed: May 4, 2010

(65) Prior Publication Data

US 2011/0271489 A1    Nov. 10, 2011

(51) Int. Cl.
*B62J 27/00* (2006.01)
*B62K 21/26* (2006.01)

(52) U.S. Cl.
CPC ........................................ *B62J 27/00* (2013.01)
USPC ................................ 16/421; 16/426; 16/422

(58) Field of Classification Search
CPC ...... B62K 21/26; B62K 21/125; B62K 21/18; B62K 21/24
USPC .................... 16/421, 422, 426, 430
See application file for complete search history.

(56) References Cited

U.S. PATENT DOCUMENTS

| | | | |
|---|---|---|---|
| 2,076,836 A * | 4/1937 | Goldblatt | 16/110.1 |
| 2,127,154 A * | 8/1938 | Burk | 294/187 |
| 2,131,687 A | 9/1938 | Kaplan | |
| 2,212,755 A | 8/1940 | Solomon | |
| 2,871,054 A | 1/1959 | Zinke | |
| 4,328,761 A | 5/1982 | Dwyer | |
| 4,337,053 A * | 6/1982 | Stevens | 440/87 |
| 4,516,800 A | 5/1985 | Coronado | |
| 4,580,751 A | 4/1986 | Panzer | |
| 4,915,058 A | 4/1990 | Murray | |
| 4,932,701 A | 6/1990 | Cornillier et al. | |
| 4,948,123 A | 8/1990 | Schook | |
| 4,956,882 A | 9/1990 | Cohn | |
| 5,002,149 A | 3/1991 | Watanabe et al. | |
| 5,052,320 A * | 10/1991 | Cremer | 114/146 |
| 5,087,005 A | 2/1992 | Holoff et al. | |

(Continued)

FOREIGN PATENT DOCUMENTS

| | | |
|---|---|---|
| EP | 0689966 A1 | 1/1996 |
| EP | 1369346 A2 | 12/2003 |

(Continued)

OTHER PUBLICATIONS

Hand Vacuum Cups and Suction Cups Sep. 1, 2000 http://web.archive.org/web/20000901014715/http://www.anver.com/document/vacuum%20handcups/hndcup-manual.htm.*

(Continued)

*Primary Examiner* — Jeffrey O Brien
(74) *Attorney, Agent, or Firm* — Russ Weinzimmer & Associates P.C.

(57) ABSTRACT

A handle is disclosed for passenger use on a motorcycle. The handle is easily detachable from the motorcycle, by the use of a suction cup. The handle is firmly securable to the body of the motorcycle, while also offering enhanced gripping comfort for a passenger. The handle includes a proximal end attached to and protruding from a base that is fixed to the top of the suction cup, and a gripping portion oriented so as to be grippable by a user when the removable handle is attached to a motorcycle body, the gripping portion including a free distal end. In this manner, the handle is positioned such that when it is secured to the motorcycle body, the handlebar portion of the handle can be gripped by the passenger in a way that is comfortable for the passenger, even when the passenger leans their weight on the handles.

18 Claims, 22 Drawing Sheets

(56) References Cited

U.S. PATENT DOCUMENTS

| | | | | |
|---|---|---|---|---|
| 5,176,357 | A | 1/1993 | Hobart | |
| 5,385,161 | A | 1/1995 | Loker et al. | |
| 5,411,460 | A | 5/1995 | Karlson et al. | |
| 5,484,081 | A | 1/1996 | Jahn | |
| 5,555,779 | A | 9/1996 | Holden | |
| 5,641,105 | A | 6/1997 | Goto | |
| D392,160 | S | 3/1998 | Schmidt | |
| 5,782,516 | A | 7/1998 | Partida | |
| 5,967,534 | A * | 10/1999 | Bradley, Jr. | 280/47.371 |
| 6,154,929 | A | 12/2000 | Dwyer | |
| 6,170,894 | B1 | 1/2001 | Baker et al. | |
| 6,305,052 | B1 * | 10/2001 | Sinclair | 16/430 |
| 6,594,862 | B2 * | 7/2003 | Totani et al. | 16/430 |
| 6,609,689 | B1 * | 8/2003 | Knapp | 248/205.5 |
| 6,868,584 | B2 * | 3/2005 | Trottier | 16/421 |
| 6,896,279 | B2 * | 5/2005 | Galvagno | 280/304.5 |
| 6,962,314 | B2 * | 11/2005 | Hsu | 248/205.5 |
| 7,004,521 | B2 | 2/2006 | Ishii | |
| 7,013,533 | B2 * | 3/2006 | Lumpkin | 16/421 |
| 7,021,593 | B1 * | 4/2006 | Fan | 248/206.2 |
| 7,137,640 | B1 * | 11/2006 | Rice et al. | 280/304.5 |
| 7,182,359 | B2 * | 2/2007 | Galvagno | 280/288.4 |
| 7,322,092 | B2 | 1/2008 | Adas et al. | |
| D616,285 | S * | 5/2010 | Kimber | D8/349 |
| 7,753,324 | B2 * | 7/2010 | Chien et al. | 248/205.8 |
| D626,816 | S * | 11/2010 | Claxton | D8/303 |
| 7,866,002 | B2 * | 1/2011 | Wang | 16/421 |
| 7,992,908 | B2 * | 8/2011 | Finck | 248/205.8 |
| 8,122,569 | B2 * | 2/2012 | Paul | 16/426 |
| 2002/0116790 | A1 * | 8/2002 | Walker | 16/422 |
| 2003/0196299 | A1 * | 10/2003 | Trottier | 16/421 |
| 2003/0229966 | A1 * | 12/2003 | Boice | 16/110.1 |

FOREIGN PATENT DOCUMENTS

| | | |
|---|---|---|
| JP | 61289928 A2 | 12/1986 |
| JP | 01197189 A2 | 8/1989 |
| JP | 09154653 A2 | 6/1997 |
| JP | 09323731 A2 | 12/1997 |
| JP | 2006218258 A2 | 8/2006 |
| WO | 9300549 A1 | 1/1993 |
| WO | 9603866 A1 | 2/1996 |
| WO | 03030678 A2 | 4/2003 |
| WO | 2006100482 A1 | 9/2006 |
| WO | 2009047375 A1 | 4/2009 |

OTHER PUBLICATIONS http://www.getagriptv.com/index2.html Jun. 4, 2009 The Official Get-A-Grip™ Safety Grip Bath Handle.

http://www.drugsupplystore.com/servlet/the-Home-Medical-cln-Bathroom-Safety-cln-Suction-Cup-Grab-Bar/Categories Jun. 4, 2009.

http://www.hardwaresalesinc.com/Hand-Tools/Misc/Misc/FastCap-HOD-DOUBLE-Suction-p6582942.html Jun. 4, 2009 Fastcap Hod—Double Suction Cup handle.

http://www.amazon.com/Heavy-Duty-Power-Puller-Suction-Cup-Handle/dp/B000UCP9P4 Jun. 4, 2009 Heavy-Duty 5" Power Puller Suction-Cup Handle—110 Lb Capacity.

http://www.anver.com/document/vacuum%20handcups/hndcup-manual.htm Jun. 4, 2009 Hand Vacuum Cups and Suction Cups.

http://www.createforless.com/Wrights/EZ+Quilters+Handle/pid15065.aspx?utm_source=cj&utm_medium=cse&URL=http%3A%2F%2Ftracking.searchmarketing.com%2Fclick.asp%3Faid%3D304414016 Jun. 4, 2009.

http://www.norfieldfestool.com/fegesuha.html Jun. 4, 2009 Gecko Suction Handle.

http://window-cleaning-supply.com/prod-Suction_Cup_Grabber_Pump_Up_8_Heavy_Duty_Vacuum_Cup-1247.aspx Jun. 4, 2009.

http://thekneeslider.com/archives/2008/06/18/tankgrip-tank-mounted-sportbike-handles/ Jun. 4, 2009 TankGrip Tank Mounted Sportbike Handles.

http://www.shopzilla.com/suction-handles/search Jun. 4, 2009 280 LB Lift-Capacity 3-Head Suction Cup Handle.

* cited by examiner

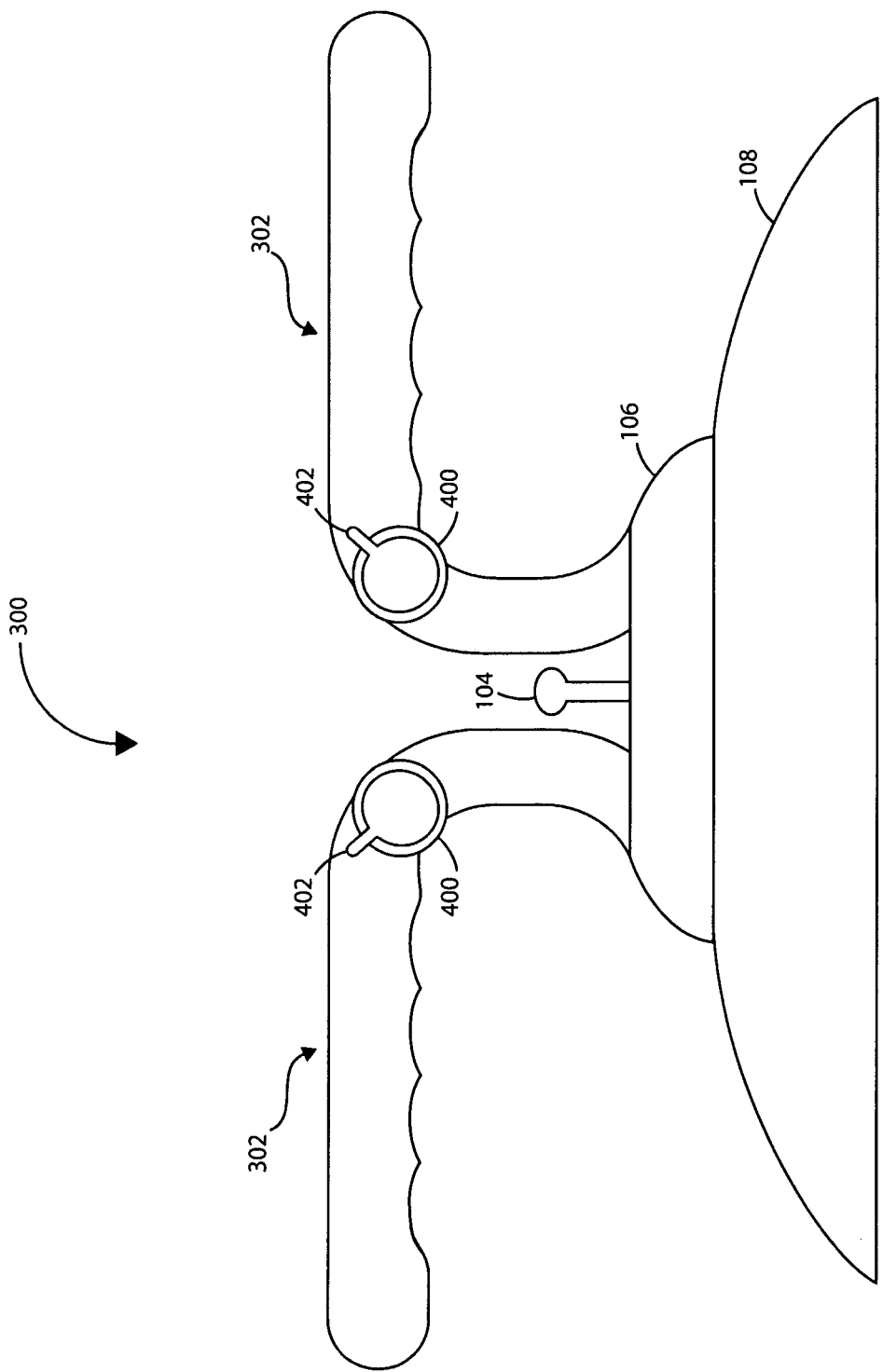

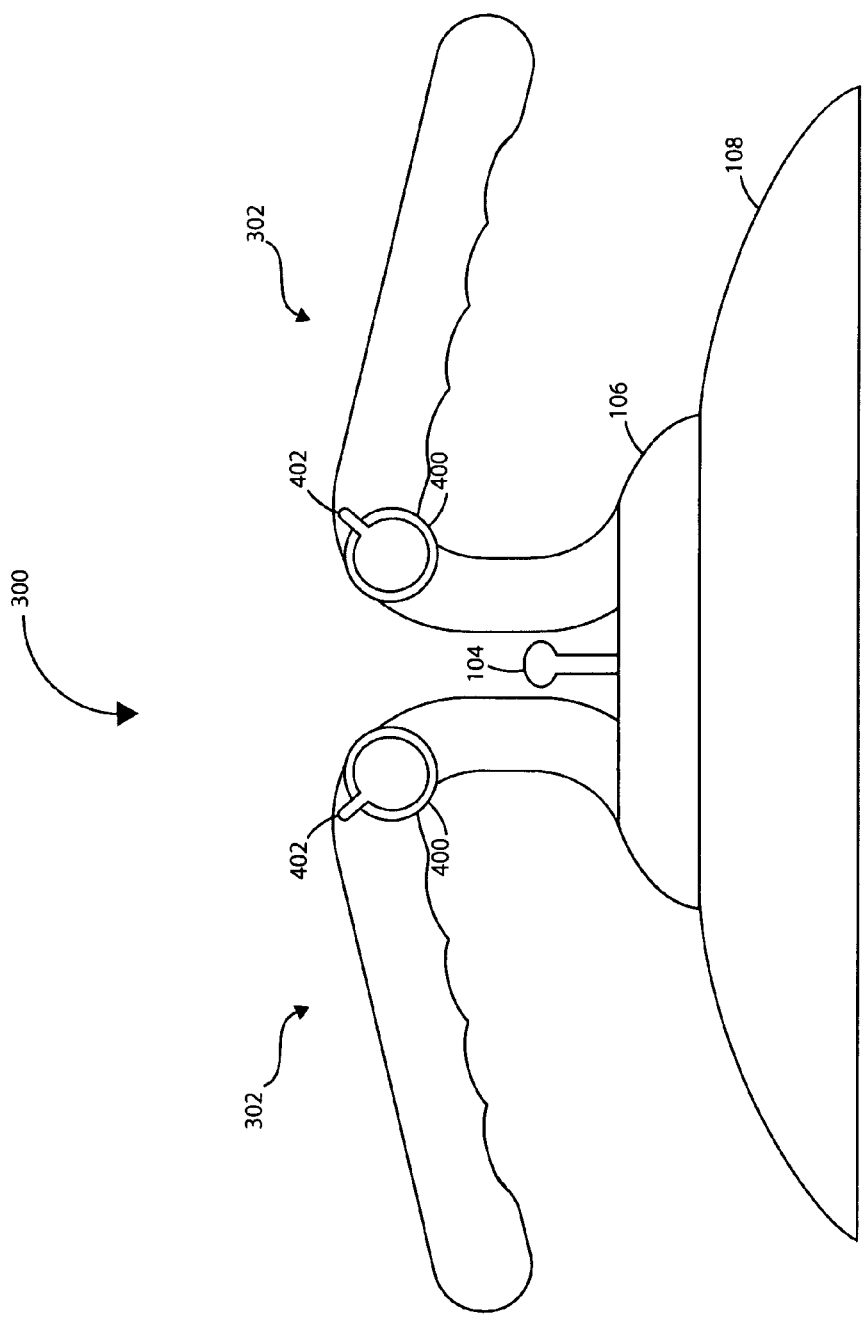

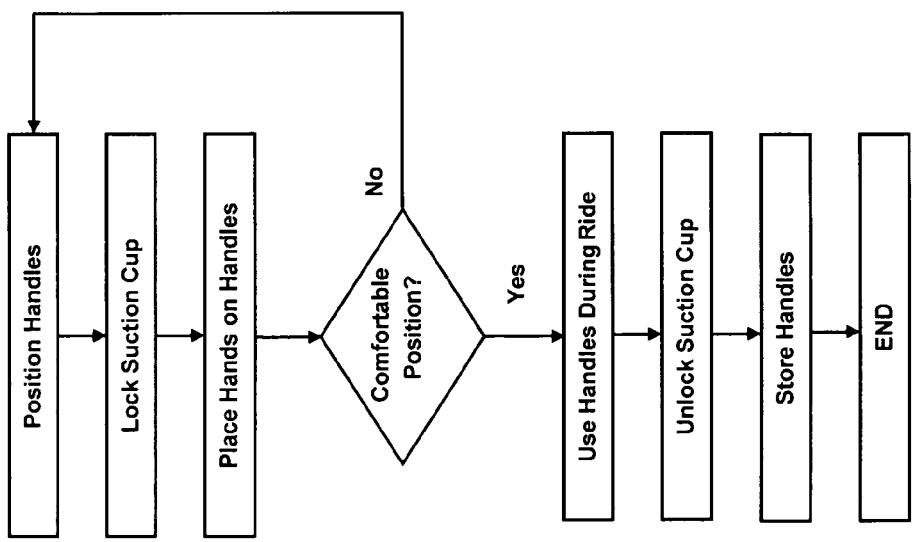

REMOVABLE SAFETY HANDLE FOR MOTORCYCLE PASSENGERS

FIELD

This invention relates generally to vehicle safety equipment, and more specifically to motorcycle safety equipment.

BACKGROUND

Motorcycling is a recreational past time enjoyed by motorcycle drivers and passengers alike. Riding on motorcycles is known to involve safety risks, given the lack of protection of motorcycle riders. While all motorcycles have handles for the driver of a motorcycle, many motorcycles do not have handles for the passenger.

The general lack of passenger handles requires the passenger to put their hands palms down against the gas tank, or else hold onto the body or clothes of the motorcycle driver, but this can be uncomfortable and/or unsafe for both the passenger and the driver. For example, if a passenger is simply pressing their hands against the gas tank, they do not have a way of anchoring their body. If the passenger holds onto the driver, they can lose their balance in the event that the driver shifts his or her weight unexpectedly, thereby endangering themselves as well as possibly also causing balance issues for the driver. The movement and weight distribution of motorcycle riders and passengers during accelerating, turning, maneuvering around challenging objects or through rough roads or terrain, and/or braking (especially sudden braking) can pose significant risks to a passenger. Furthermore, a driver's mobility can be restricted by a passenger holding onto the driver's body or clothes. For such reasons, the passenger is put at greater risk, and the driver is inconvenienced by the need to concentrate on the safety of both themselves and the driver.

Passenger handles have been proposed for motorcycles, but some of these handles are not quickly and easily detachable from the motorcycle, therefore detracting from the general aesthetics of the motorcycle itself. Other handles available for motorcycles which do readily detach from the motorcycle, via suction cups for example, are difficult or uncomfortable to use because of their design and orientation during use. Handles detachable via suction cups generally have handles which are attached at both ends to a base while also having a gripping portion parallel to the base. When applied to a surface of the motorcycle that is accessible to the passenger, these handles do not provide the same level of comfort as the driver's handles, for example. Passengers, many of whom are female and may have thin wrists, can strain their wrists or put themselves in an awkward position when using these detachable handles, thereby facing discomfort as well as the risk of minor or serious injury.

SUMMARY

A handle is claimed for passenger use on motorcycle vehicles. The handle is easily detachable from the motorcycle, by the use of a suction cup. The handle is firmly securable to the body of the motorcycle, while also being designed to offer enhanced comfort level for passengers. The handle includes a proximal end attached to and protruding from a base above the suction cup, and a gripping portion oriented so as to be comfortably grippable by a user when the passenger handle is attached to a motorcycle body surface, the gripping portion including a free distal end. In this manner, the handle is positioned such that when it is secured to the motorcycle body, the handlebar portion of the handle can be gripped by the passenger in a way that is comfortable for the passenger, even when the passenger leans their weight on the handles.

A removable handle for use by a passenger riding on a motorcycle is claimed, the removable handle comprising a base for supporting a handlebar, a suction cup attached to the underside of the base, the suction cup being suitable for attaching the handle to a motorcycle body surface, at least one handlebar having a proximal end attached to the base, and a gripping portion connected to the proximal end and oriented so as to be grippable by a user when the removable handle is attached to the motorcycle body surface, the gripping portion including a free distal end not attached to the base, and a locking mechanism attached to at least one of the base and the handlebar, for locking the suction cup to a motorcycle body surface.

In some embodiments, the suction cup is a vacuum cup. In some embodiments, the suction cup is circular. In some embodiments the base is circular. In some embodiments, the proximal end of the handlebar is attached to a side or the top of the base. In some embodiments, the gripping portion further includes a gripping feature for facilitating gripping of the gripping portion. In some embodiments, the gripping feature includes bumps and/or grooves. In some embodiments, the gripping portion is substantially parallel to the suction cup. In some embodiments, the gripping portion is substantially parallel to the base.

In some embodiments, the locking mechanism includes a lever. In some embodiments, the lever is a suction lever. In some embodiments, the lever is a pump lever. In some embodiments, the locking mechanism is located on the top surface of the base, underneath the gripping portion of the handlebar. In some embodiments, the gripping portion is straight. In some embodiments, the gripping portion is curved. In some of these embodiments, the gripping portion contains a convex curve, and in some of these embodiments, the gripping portion contains a concave curve.

In some embodiments, the removable handle includes one handlebar, while in other embodiments, the removable handle includes two handlebars. In some embodiments, at least one handlebar includes a joint lock, for moving the gripping portion of the handlebar relative to the base.

BRIEF DESCRIPTION OF THE DRAWINGS

The following description will be more fully understood in conjunction with the appended drawings, wherein:

FIG. 4A is a front oblique view of an embodiment of a single passenger handle incorporating two handlebars having joint locks for adjusting the orientation of the gripping portions of both handlebars relative to the base;

FIG. 4B is a front oblique view of the embodiment of FIG. 4A, with both handlebars having been adjusted to new positions;

FIG. 13 is a flowchart showing the steps of use of the passenger handle.

DETAILED DESCRIPTION

Figure 1A:
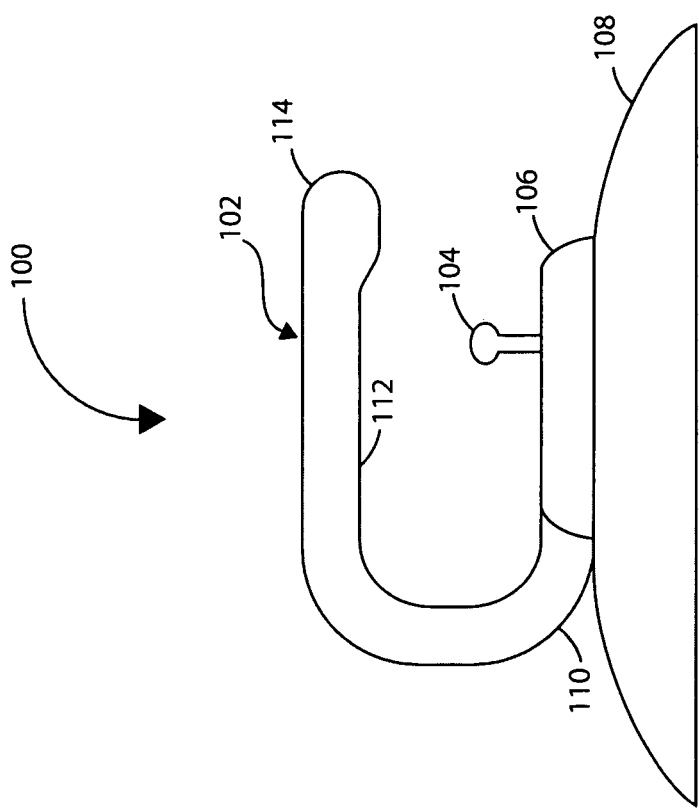
FIG. 1A is a profile view of an embodiment of the passenger handle of the invention incorporating one handlebar and a locking lever.

FIG. 1A is a profile view of an embodiment of the passenger handle 100 of the invention, including one handlebar 102 and a locking lever 104. A base support structure 106 has a suction cup 108 attached to an underside of the base 106. The locking lever 104 and the suction cup 108 work together to form a locking mechanism, such as a suction or vacuum lock, that serves to lock and unlock the suction cup 108 to a motorcycle surface such as its gas tank. Recess 116 serves to protect lever 104 from accidentally being unlocked by user's hand while in the locked mode.

Handlebar 102 is supported by a distal end 110 that is attached to a top of the base 106. The handlebar 102 also has an unattached or free-floating proximal end 114 that forms the terminus of a gripping portion 112. The proximal end 114 and the gripping portion 112 are sufficiently elevated above the base 106 and oriented to enable the handlebar 102 to mimic a steering handlebar of a typical motorcycle type vehicle such that they are as easily and comfortably grippable by a user as the steering handlebars of the vehicle when the handle 100 is attached to the vehicle's body. The elevation and orientation of the gripping portion and proximal end of the handlebars 102 is achieved at least in pert by the dimensions and orientation of the portion of the handlebar 102 between the distal end 110 and the gripping portion 112.

The passenger handles 100 of the invention provide enhanced gripping comfort to a passenger of a motorcycle type vehicle because the elevation and spatial orientation of the gripping portion 112, as it terminates at the and free proximal end 114 of handlebar 102, are designed to provide a natural handlebar feel to the passenger. The experience of gripping such a handle is similar to that of gripping the steering handlebar of a motorcycle or a bicycle or the like, and the handlebar minimizes strain on a user's hand, wrist and arm in the same way that it does for the driver of such a vehicle.

Figure 1B:
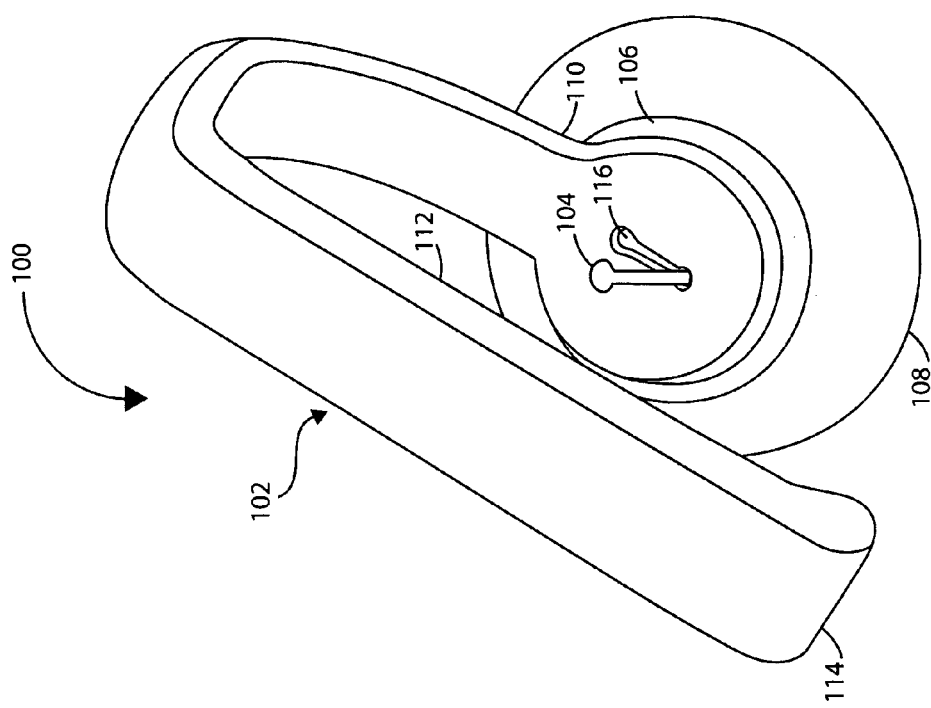
FIG. 1B is an oblique view of the embodiment shown in FIG. 1A.
Figure 1C:
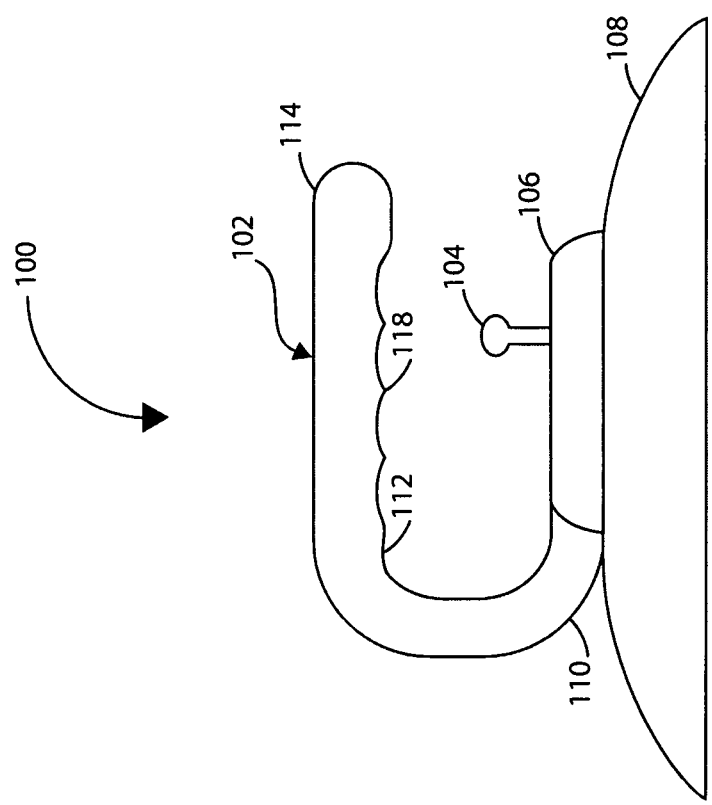
FIG. 1C is a profile view of the embodiment shown in FIG. 1A, further including a gripping feature.

FIG. 1B is profile view of the same embodiment shown in FIG. 1A. This handle 100 provides a single handlebar 102 for one hand, and would typically be accompanied by another such handle 100. The handles 100 could be placed in whatever orientation relative to each other that a user preferred. FIG. 1C is a profile view of the embodiment shown in FIG. 1A, further including a gripping feature in the form of a series of bumps 118 on the underside of the gripping portion 112 of the handlebar 102, which facilitate gripping of the handlebar 102. Other possible gripping feature configurations, such as grooves, will be readily apparent to one skilled in the art.

Figure 2A:
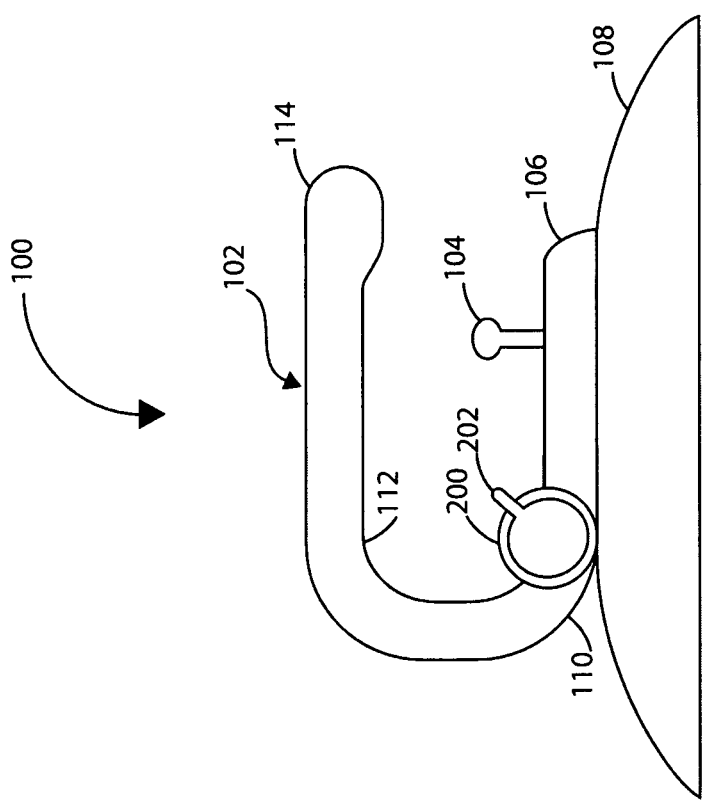
FIG. 2A is a profile view of the embodiment of FIG. 1A, including a joint lock for adjusting the orientation of the gripping portion of the handlebar relative to the base.

FIG. 2A is a profile view of the embodiment of FIG. 1A, including a joint lock 200 for adjusting the orientation of the gripping portion 112 of the handlebar relative to the base. The joint lock 200 can permit rotation of the handlebar 102 about the joint lock 200 in at least one plane, for example in the vertical plane. The joint lock 200 can include a trigger mechanism, such as a pull pin 202 for example, which enables the joint lock to rotate and lock in various different positions.

Figure 2B:
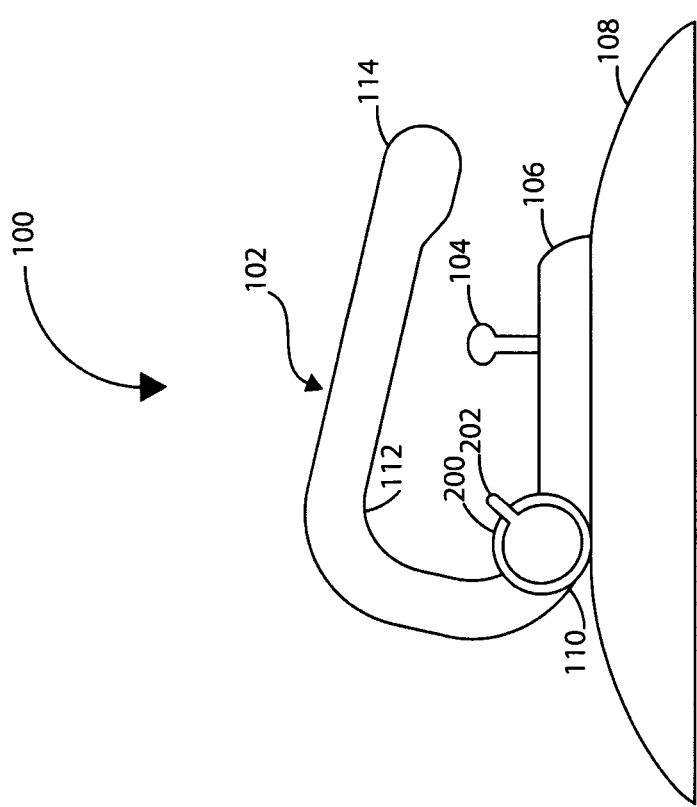
FIG. 2B is a profile view of the embodiment of FIG. 2A, with the handlebar having been adjusted to a new position via the joint lock.

FIG. 2B is a profile view of the embodiment of FIG. 2A, with the handlebar 102 having been adjusted to a new position via the joint lock 200. In this figure, the handlebar 102 has been rotated in the vertical plane, about the joint lock 200. This can enable a user of the passenger handles 100 to adjust the orientation of the handlebars 102 to accommodate their preferred hand gripping position.

Figure 3A:
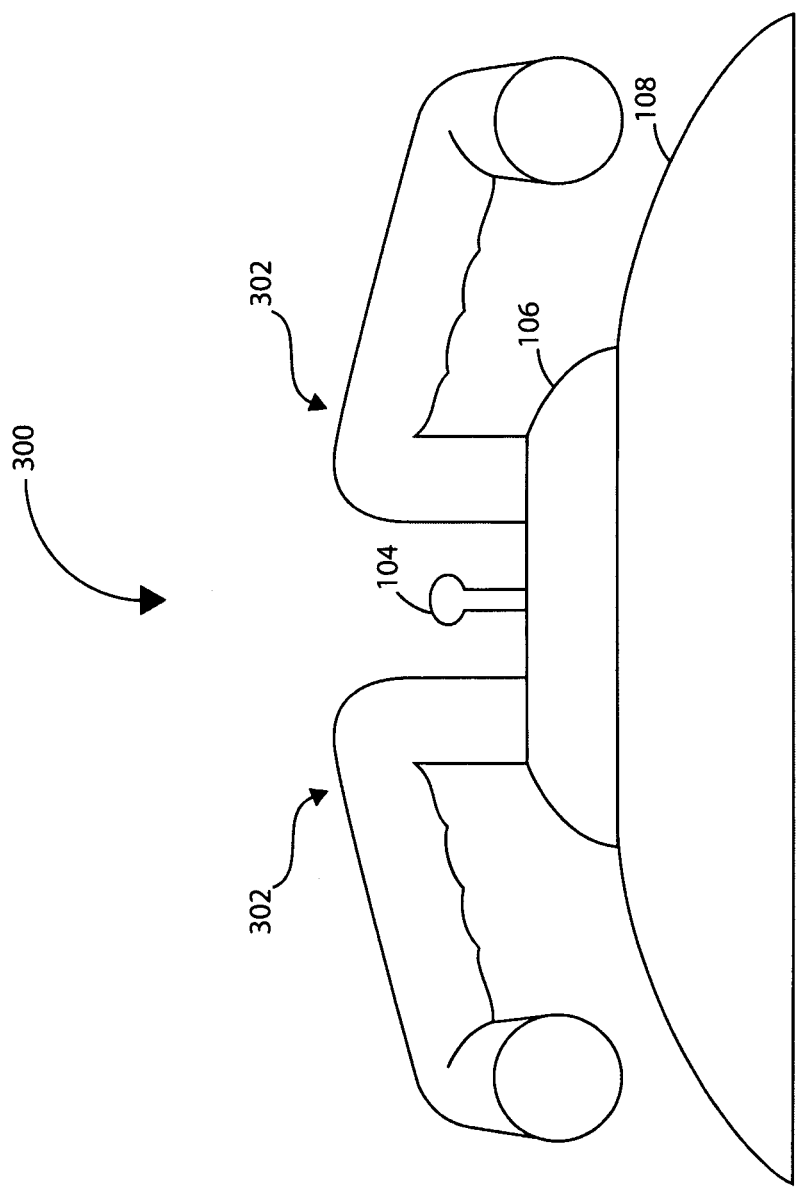
FIG. 3A is a front oblique view of an embodiment of a single passenger handle incorporating two handlebars.
Figure 3B:
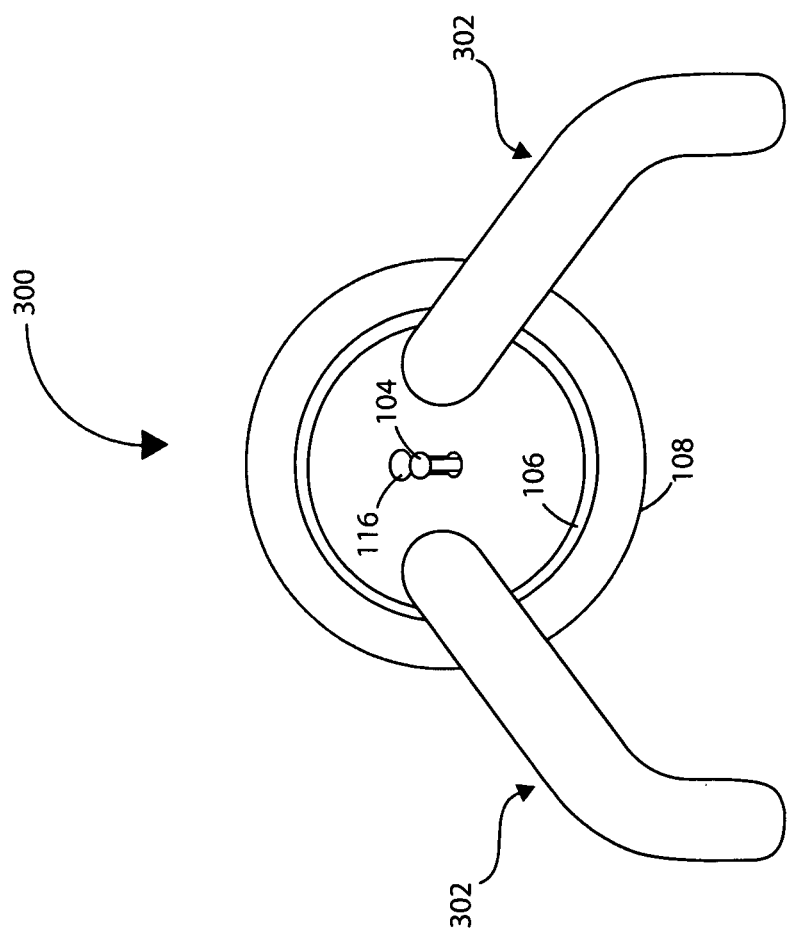
FIG. 3B is a top oblique view of the embodiment of FIG. 3A.

FIG. 3A is an oblique view of a passenger handle embodiment 300 incorporating two handlebars 302. This design provides handlebars 302 for both of a passenger's hands, on the same unit. This design may be preferred by some users because of its enhanced portability, and for eliminating the inconvenience of requiring a user to position two separate handle units to a motorcycle body surface. FIG. 3B is a top view of the embodiment of FIG. 3A.

FIG. 4A is an oblique view of the embodiment of FIG. 3, with joint locks 400 for adjusting the orientation of the gripping portions 112 of both handlebars 302 relative to the base. Each joint lock 400 can permit rotation of the handlebar 302 about the joint lock 400 in at least one plane, for example in the vertical plane. As discussed in connection with FIG. 2A, the joint locks 400 can include a trigger mechanism, such as a pull pin 402 for example, which enables each joint lock 400 to rotate and lock in various different positions. FIG. 4B is an oblique view of the embodiment of FIG. 4A, with both handlebars 302 having been adjusted to new positions via the joint locks 400. In this figure, the each handlebar 302 has been rotated in the vertical plane, about its corresponding joint lock 400. This can enable a user of the passenger handle 300 to adjust the orientation of the handlebars 302 to accommodate their preferred hand gripping positions.

Figure 5:
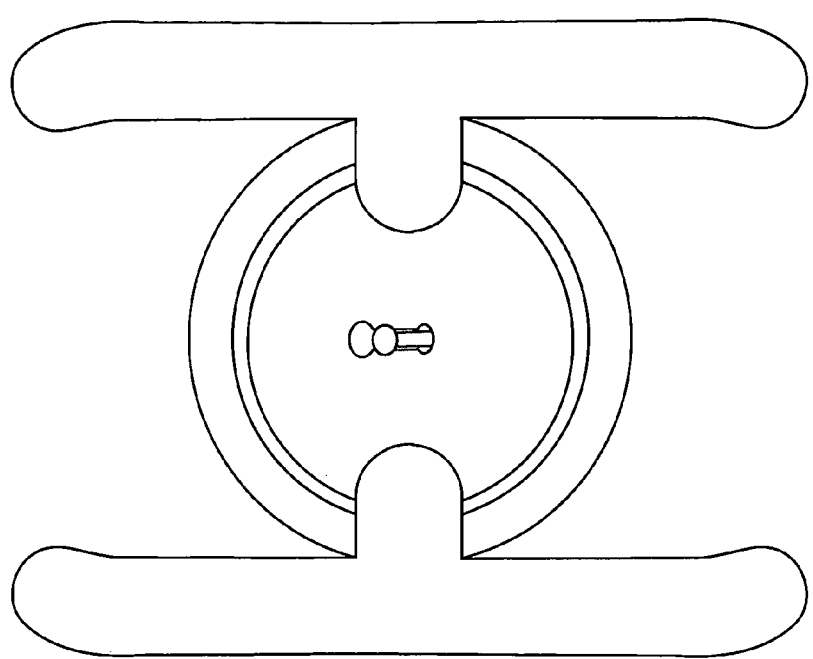
FIG. 5 is a top view of an alternative embodiment of the passenger handle.

FIG. 5 is a top view of an alternative embodiment of the passenger handle. In the embodiment shown in this figure, the handlebars 500 are T-bar shaped. This T-bar configuration enables the gripping portions of each handle 500 to protrude beyond both the front and back of the base 106. providing a user with options as to where to place each of his hands relative to each other and relative to the base 106.

Figure 6A:
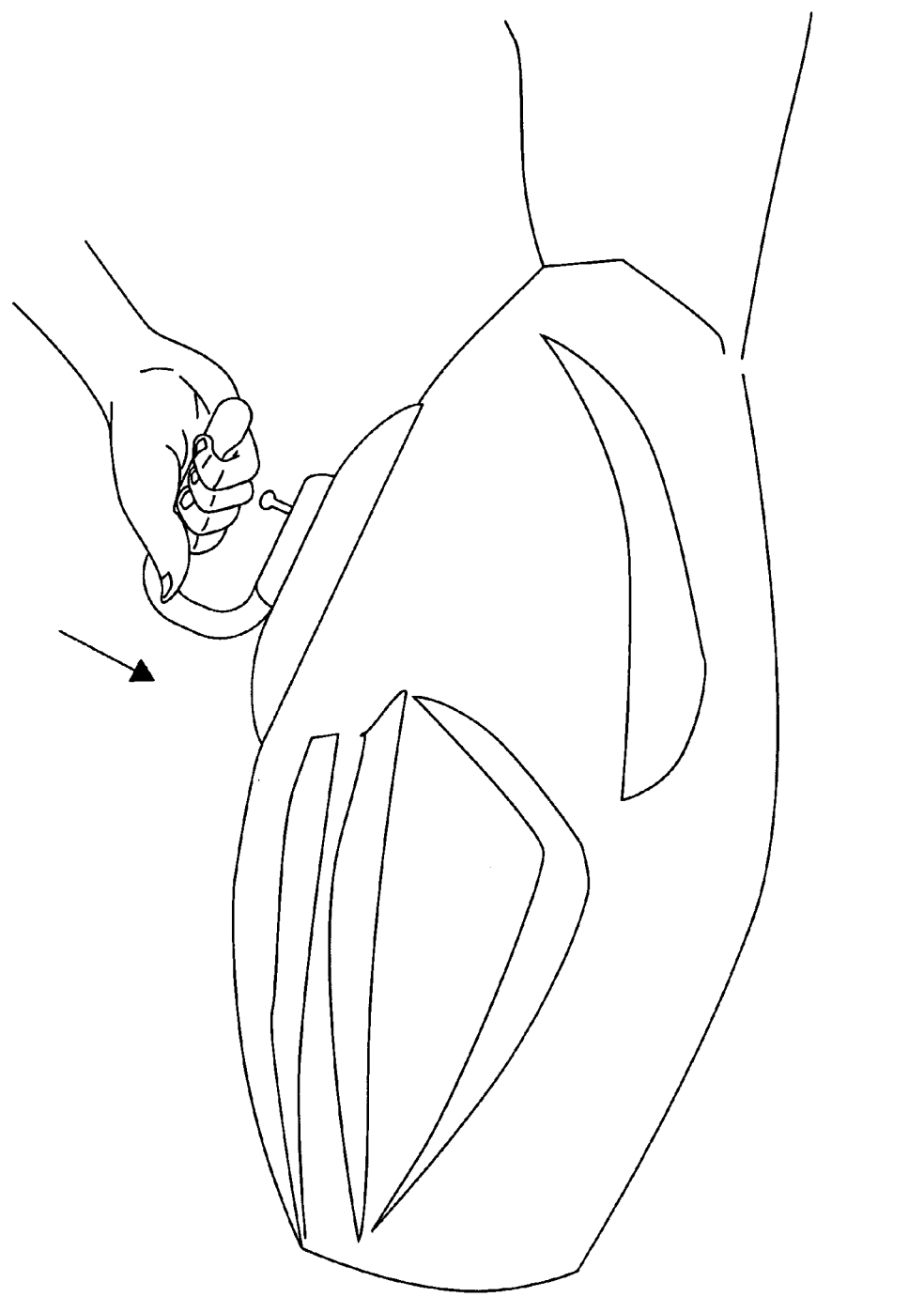
FIG. 6A is a profile view of the embodiment shown in FIG. 1A being applied to a surface before being locked in place against the surface.
Figure 6B:
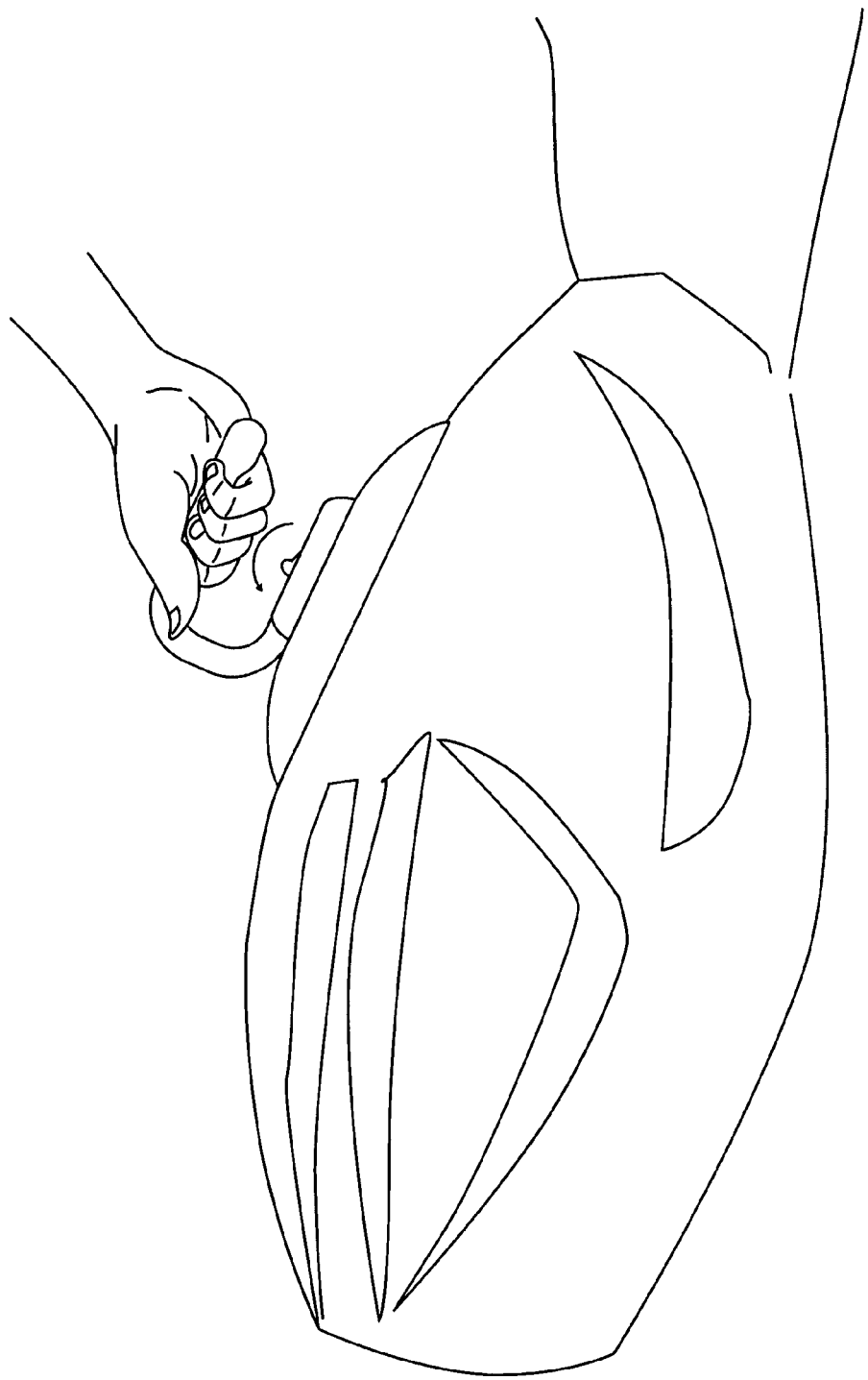
FIG. 6B is a profile view of the embodiment shown in FIG. 6A attached to a surface, illustrating the locking of the handlebar via a locking lever.

FIG. 6A is a profile view of the handle embodiment shown in FIG. 1A being applied to a surface 600 before being locked in place against the surface 600. The handle 100 is placed such that its suction cup 108 is pressed firmly against the surface. FIG. 6B is a profile view of the embodiment shown in FIG. 6A attached to the surface 600, illustrating the locking of the suction cup 108 via a locking lever 104. As shown in the figure, the lever 104 is pulled down from its vertical orientation, into a more horizontal orientation, thereby locking the suction cup 108 to the surface. In other embodiments, the lever 104 can be moved in a different direction, to accommodate the same locking function.

Figure 6C:
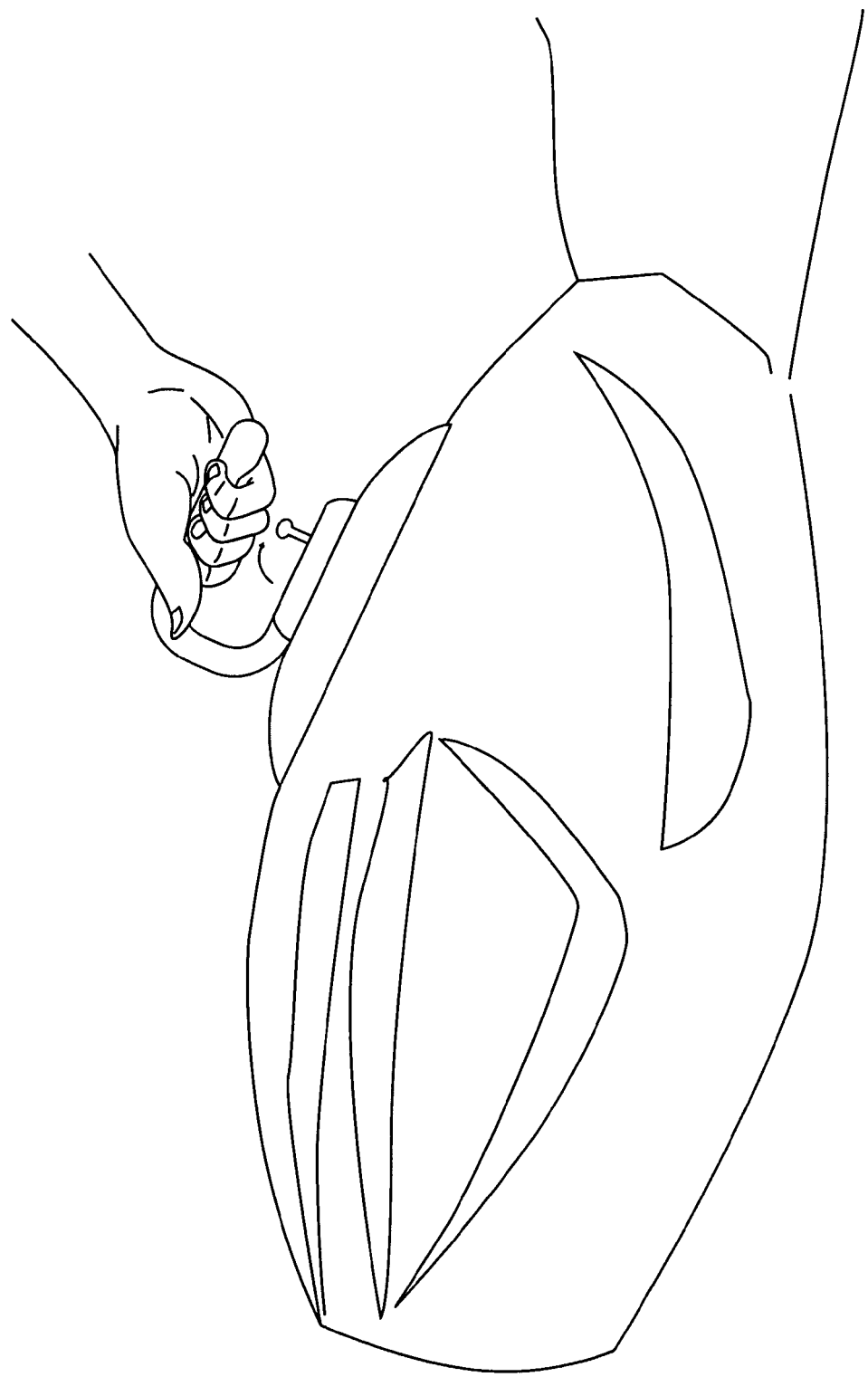
FIG. 6C is a profile view of the embodiment shown in FIG. 6A attached to a surface, illustrating the release of the locking lever.
Figure 6D:
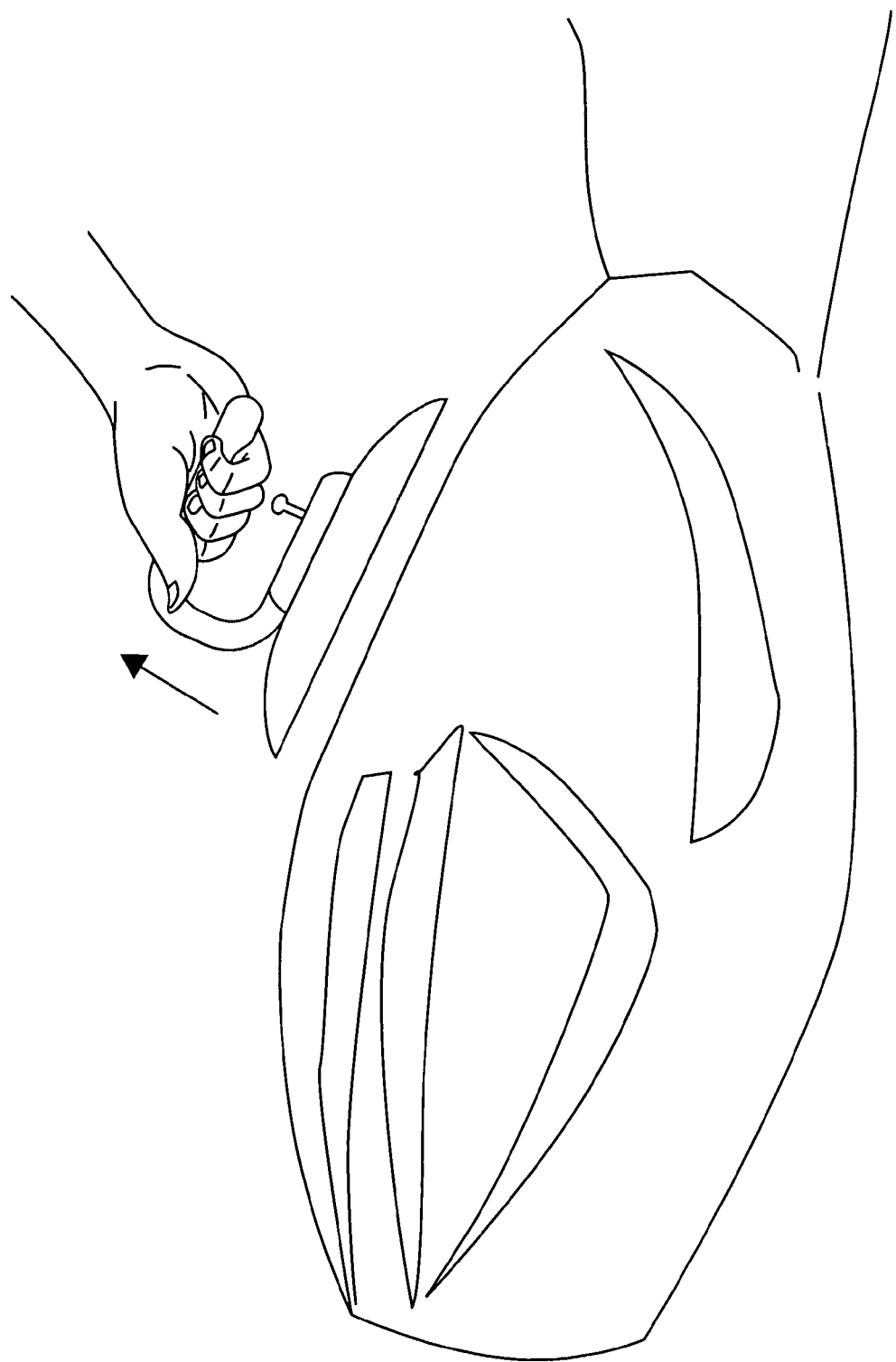
FIG. 6D is a profile view of the embodiment shown in FIG. 6A, with the passenger handle being removed from the surface.

FIG. 6C is a profile view of the embodiment shown in FIG. 6A attached to a surface, illustrating the release of the locking lever 104. In this embodiment, the lever 104 is pulled upwards and back into its vertical orientation, thereby releasing the suction cup 108 from the surface 600. FIG. 6D is a profile view of the embodiment shown in FIG. 6A, with the passenger handle 100 being removed from the surface.

Figure 7A:
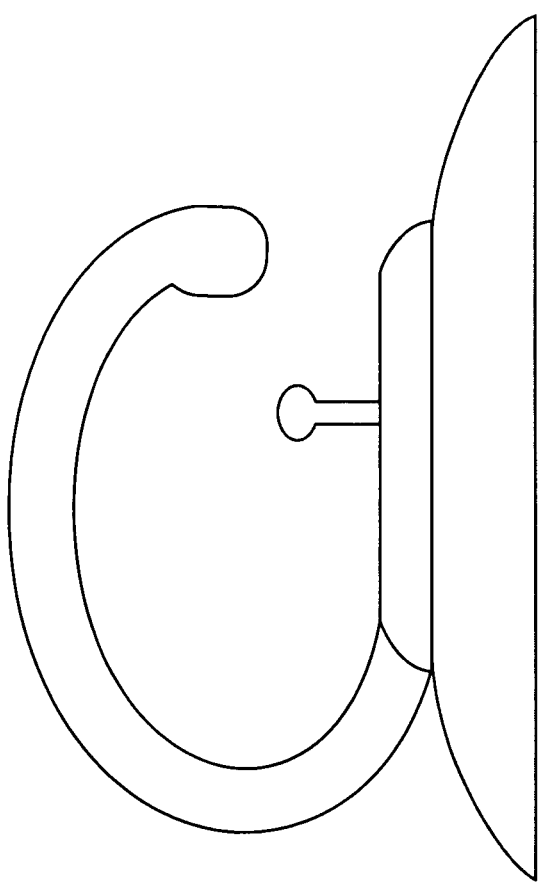
FIG. 7A is an alternative embodiment of the passenger handle, containing a gripping portion containing a convex curve.
Figure 7B:
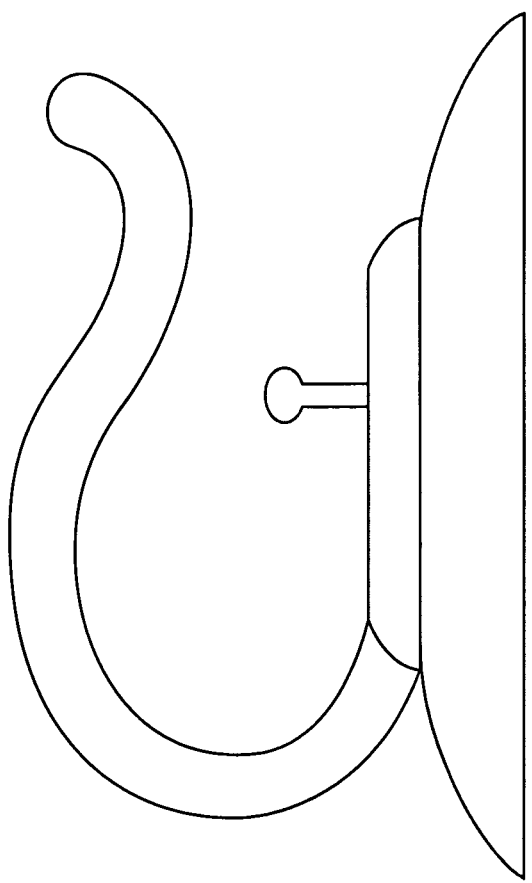
FIG. 7B is an alternative embodiment of the passenger handle, containing a gripping portion containing a concave curve.

FIG. 7A is an alternative embodiment of the passenger handle 700, containing a gripping portion 702 with a convex curve 704. FIG. 7B is an alternative embodiment of the passenger handle 704 containing a gripping portion with a concave curve 706. Different shape handlebars may appeal to different users, and the invention is not restricted to anyone handlebar shape.

Figure 8:
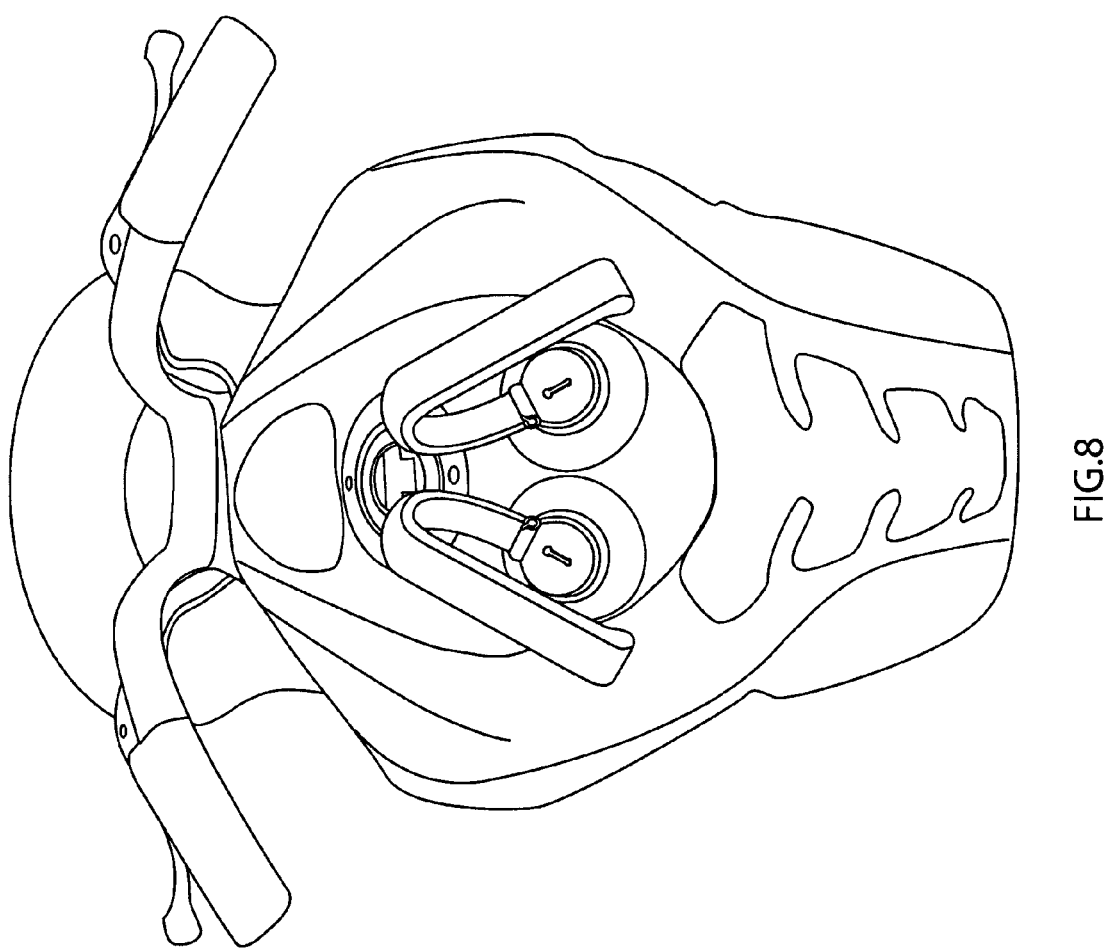
FIG. 8 is an elevated angle view of a pair of passenger handles attached to a motorcycle body surface, each handle containing a single handlebar.

FIG. 7-8 is an elevated angle view of a pair of passenger handles 800, 802 attached to a motorcycle body surface 804, each handle containing a single handlebar 806, 808. These handles 806, 808 are placed in positions relative to each other by a user, so as to provide maximum comfort to that user. One of the advantages of two separate handle units, where each handle contains a single handlebar, is the ability for a user to position the two handlebars into whichever orientation relative to each other that the user finds most comfortable. As an example, a user who has a slightly compromised shoulder or back may wish to position one handlebar closer to the user's torso, than the other handlebar.

Figure 9:
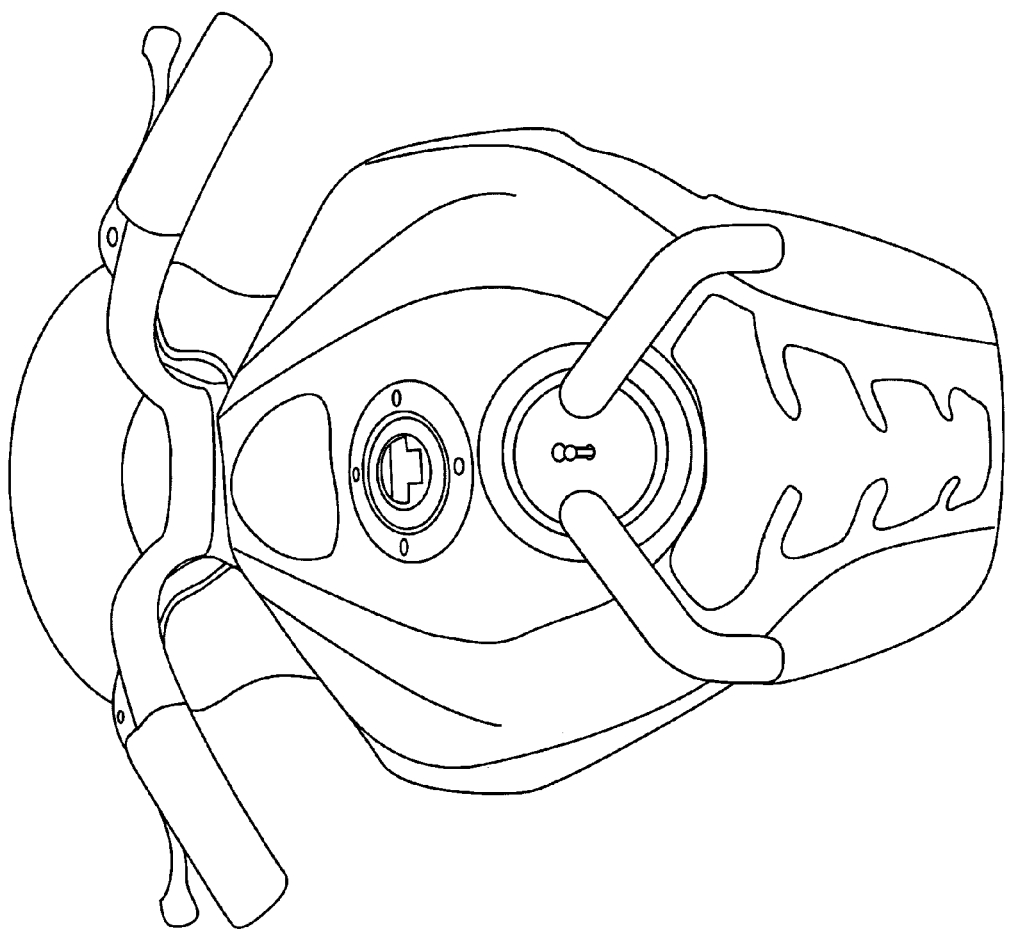
FIG. 9 is an elevated angle view of a passenger handle containing two handlebars attached to a motorcycle body surface.

FIG. 9 is an elevated angle view of a passenger handle 900 containing two handlebars 902, 904 attached to a motorcycle body surface 906. As discussed above in connection with FIG. 3A, this design may be preferred by some users because of its enhanced portability, and for eliminating the inconvenience of requiring a user to position two separate handle units to a motorcycle body surface.

Figure 10:
FIG. 10 is an illustration of a passenger using the passenger handles.

FIG. 10 is an illustration of a passenger 1000 using two passenger handles 1002, 1004, each with its own handlebar 1006, 1008. The free distal ends 1010, 1012 of the handlebars 1006, 1008 provides for a more comfortable and anatomical grip of the handles 1002, 1004. Particularly for riding on motorcycles, a free distal end similar to the handles configuration for motorcycle or bicycle riders facilitates gripping, and allows for better posture during riding, both in cases where the user leans their weight on the handles, or where the user is sitting more erect and exerting less force on the handlebars. The user's wrists will be in a more natural position, and less strained, than would be the case when using typical suction cup handles.

In the figure shown, the passenger 1000 is a separate handle 1002, 1004 for each handlebar 1006, 1008. This enables a user to place the respective handles in whatever position and orientation relative to each other that the user prefers. As an example, a user who has a slightly compromised shoulder or back may wish to position one handlebar closer to the user's torso, than the other handlebar.

Figure 11:
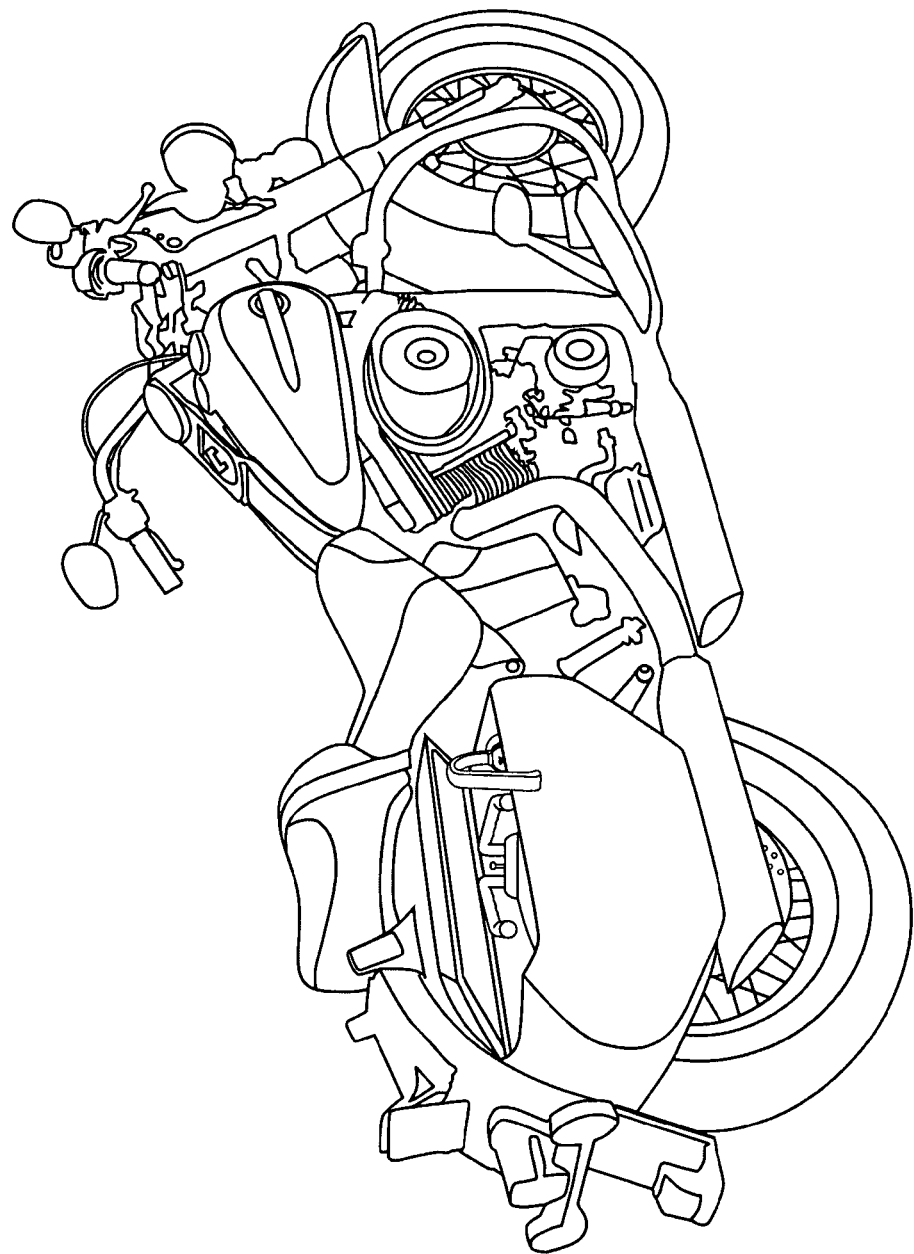
FIG. 11 is an illustration of the handles being stored in trunk of motorcycle
Figure 12:
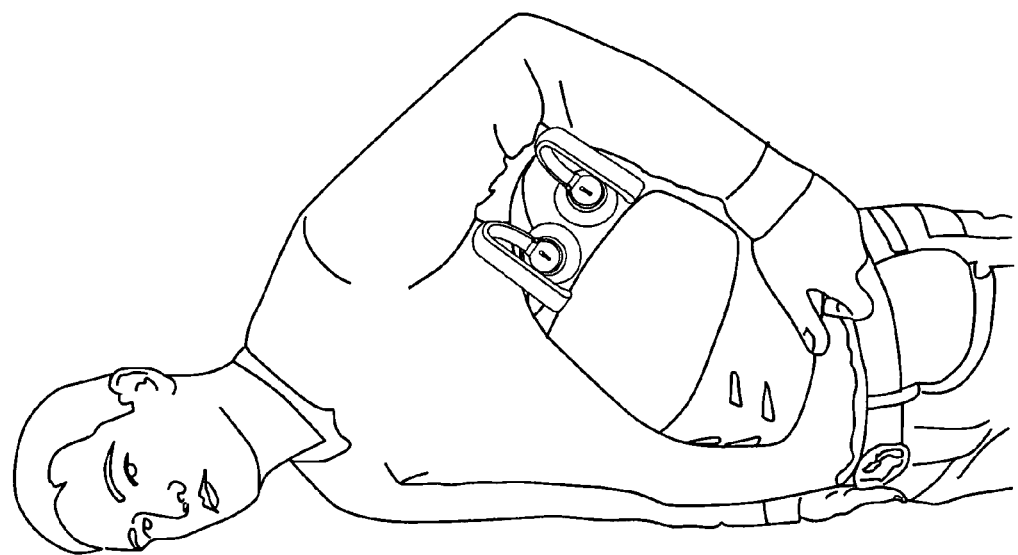
FIG. 12 is an illustration of the handles being attached to helmet.

FIG. 11 is an illustration of handles 1100, 1102 being stored in a trunk 1104 of motorcycle. Alternatively, the handles 1100, 1102 can be carried with a user when not being used. FIG. 12 is an illustration of handles 1200, 1202 being attached to a user's helmet 1204. The handles 1200, 1202 can be attached via suction directly to the helmet 1204.

FIG. 13 is a flowchart showing the steps of use of the passenger handle. First, a user positions the handles to suit their body type, posture, and comfort level 1300, and then they lock the suction cups 1302 and place their hands on the handlebars 1304. If the handles are not in the optimal position and orientation for the user 1306, they can reposition 1300 and try again. The user then uses the handles as appropriate during the motorcycle ride 1308, so as to maximize his and the driver's comfort and safety. After the ride is over, the user can unlock the suction cups 1310, and stow the handles 1312, either storing them in the motorcycle trunk, or keeping them on their person to be stored elsewhere.

Other modifications and implementations will occur to those skilled in the art without departing from the spirit and the scope of the invention as claimed. Accordingly, the above description is not intended to limit the invention except as indicated in the following claims.

What is claimed is:

1. A removable handle for use by a passenger riding on a motorcycle, comprising:
   a base;
   at least one motorcycle style handlebar having a distal end coupled to the base, and a free proximal end that forms the terminus for a gripping portion;
   a locking mechanism including:
      a suction cup element formed on the underside of the base; and
      a locking lever, that when actuated in a first mode, is capable of establishing a locking vacuum between the suction cup element and a motorcycle body surface, the locking lever further configured to unlock said handle from a motorcycle body surface when actuated in a second mode to defeat the locking vacuum whenever one has been previously established therebetween, the locking lever being configured to be positioned within a recess and thereby located below a surface of the base whenever said handle is locked so that said handle cannot be inadvertently unlocked while said handle is in use.

2. The removable handle of claim 1, wherein the gripping portion further includes a gripping feature for facilitating gripping of the gripping portion.

3. The removable handle of claim 2, wherein the gripping feature includes at least one of bumps and grooves.

4. The removable handle of claim 1, wherein the gripping portion is sufficiently elevated from the base by an elevating segment to permit the gripping portion to be gripped comfortably by the passenger.

5. The removable handle of claim 1, wherein the locking lever is a pump lever.

6. The removable handle of claim 1, wherein the gripping portion is curved.

7. The removable handle of claim 6, wherein the gripping portion contains a convex curve.

8. The removable handle of claim 6, wherein the gripping portion contains a concave curve.

9. The removable handle of claim 1, wherein the removable handle includes one handlebar.

10. The removable handle of claim 1, wherein the removable handle includes two handlebars.

11. The removable handle of claim 1, wherein at the least one handlebar includes a joint lock between the gripping portion and an elevating segment, the joint lock having a trigger mechanism for adjusting the gripping portion between a plurality of discreet and fixed orientations while locked to a motorcycle body surface.

12. A removable handle for use by a passenger riding on a motorcycle, comprising:
   a base;
   two motorcycle style handlebars each having a distal end coupled to the base, and a free proximal end that forms the terminus for a gripping portion;
   a locking mechanism including:
      a suction cup element formed on the underside of the base; and
      a locking lever, that when actuated in a first mode, is capable of establishing a locking vacuum between the suction cup element and a motorcycle body surface, the locking lever further configured to unlock said handle from a motorcycle body surface when actuated in a second mode by defeating the locking vacuum whenever one has been previously established therebetween, the locking lever being configured to be positioned within a recess and thereby located below a surface of the base whenever said handle is locked so that said handle cannot be inadvertently unlocked while said handle is in use.

13. The removable handle of claim 12, wherein the locking lever also serves as a pump lever for the locking mechanism.

14. The removable handle of claim 12, wherein the gripping portion of each handlebar further includes a gripping feature for increasing friction between a passengers hands and the gripping portion.

15. The removable handle of claim 12, wherein each of the two handlebars includes a joint lock disposed between the gripping portion and an elevating segment forming the distal end of the two handlebars, the joint lock having a trigger mechanism for adjusting and locking the gripping portion of each handlebar between a plurality of discreet orientations while said removable handle is locked.

16. A removable handle for use by a passenger riding on a motorcycle, comprising:
   a base;
   two motorcycle style handlebars each having a distal end coupled to the base, and a free proximal end that forms the terminus for a gripping portion, the gripping portion being rotationally adjustable through a plurality of discreet orientations when the removable handle is locked to a motorcycle body surface;
   a locking mechanism including:
      a suction cup element formed on the underside of the base; and
      a pump that when actuated is capable of establishing a locking vacuum between the suction cup element and a motorcycle body surface; and
      a pump lever that is configured to actuate the pump in a first mode to establish the locking vacuum, and to unlock said handle from a motorcycle body surface when actuated in a second mode by defeating the locking vacuum whenever one has been previously established therebetween, the pump lever configured to be positioned within a recess located below a surface of the base whenever said handle is locked so that the pump lever cannot be unintentionally actuated in the second mode while the handle is in use.

17. The removable handle of claim 16, wherein the gripping portion of the two handlebars further includes a gripping feature for increasing friction between a passengers hands and the gripping portion.

18. The removable handle of claim 16, wherein each of the two handlebars includes a joint lock, the joint lock having a trigger mechanism for adjusting and locking the gripping portion between the plurality of discreet orientations.

* * * * *